3,109,854
SILYL-OXYMETHYLENE COMPOUNDS
Hans H. Ender, Buffalo, N.Y., assignor to Union Carbide
   Corporation, a corporation of New York
No Drawing. Filed Sept. 23, 1960, Ser. No. 57,895
            9 Claims. (Cl. 260—448.8)

This invention relates to a class of novel organosilicon compounds and to processes for producing these compounds.

The compounds of this invention are represented by the formula:
(I)             $R_3SiO(CH_2O)_nY$ wherein R is a monovalent hydrocarbon group, preferably containing from one to about ten carbon atoms, Y is hydrogen or $R_3Si$-, and $n$ is an integer having a value of from 1 to about 10.

The compounds of this invention include those represented by Formula I where R in each case can be methyl, ethyl, propyl, vinyl, allyl, octyl, cyclohexyl, n-butylphenyl, mesityl and the like. In the compounds of Formula I, the R groups need not be the same throughout the molecule.

Examples of the compounds represented by Formula I are:

$(C_6H_5CH_2)_3SiOCH_2OH$
$(C_6H_{13})_3SiO(CH_2O)_3Si(C_6H_{13})_3$
$(CH_3)(C_6H_5)_2SiO(CH_2O)_5H$
$(CH_2CH)(C_2H_5)_2SiO(CH_2O)_{10}Si(C_2H_5)_2(CH_2CH)$ and the like. In the above formulas, $C_6H_5CH_2$, $C_6H_{13}$, $CH_3$, $C_6H_5$, $CH_2CH$ and $C_2H_5$ represent, respectively, benzyl, cyclohexyl, methyl, phenyl, vinyl and ethyl.

My novel process for preparing the compounds of Formula I comprises the reaction of formaldehyde, a tri(monovalent hydrocarbon)chlorosilane, $R_3SiCl$, (where R has the meaning previously defined), and water at a temperature in the range of −30° C. to 60° C. and continuously removing hydrogen chloride from the reaction. The molar ratios of reactants can vary over wide limits with the exception of the molar ratio of water to tri(monovalent hydrocarbon)chlorosilane which should be limited to 1 or less. Even large excesses of $CH_2O$ do not hinder the reaction. Molar ratios of water to trichlorosilane of over 1 are not advantageously employed because of the formation of siloxane polymers through reaction of water with the chlorosilane thus resulting in lower yields and complications in the recovery of my novel compounds. The products obtained comprise mixtures of the compounds represented by Formula I and polymeric siloxane by-products. Compounds of the Formula I can be separated from such mixtures as by fractional distillation, or the mixtures themselves can be employed as they are without fractional distillation after removal of excess reactants, hydrogen chloride, solvents, and other reagents.

An advantageous procedure for conducting my process is to slowly add (e.g., in a dropwise manner) a mixture or solution of the tri(monovalent hydrocarbon)chlorosilane and a hydrogen chloride acceptor to water and a source of formaldehyde which is preferably in solution and cooled by an ice bath or other cooling means. The ensuing reaction is strongly exothermic. Hence, the rate of addition is adjusted to maintain a low temperature consistent with the efficiency of the cooling means in removing heat formed. Usual addition times vary from five minutes to one hour. The reaction is essentially complete after all of the chlorosilane-hydrogen acceptor mixture or solution has been added. During the reaction a thick slurry may form, for example, when pyridine is employed as the hydrogen chloride acceptor. If such a slurry becomes too thick to permit ease of handling, an ether or other solvent is added any time before, during or after reaction. After the reaction is complete, extraction of the reaction mixture with ether is performed to recover the products from residues such as pyridine hydrochloride formed during reaction. Other methods such as filtering and/or washing with water can be employed to remove the products from residues. The ether extract is washed with water two or three times or more if necessary. The washing operation should preferably be carried out quickly with cold water, since the desired products undergo some hydrolysis on long contact with water and considerable hydrolysis if the water is hot. Contact with cold water for periods up to thirty minutes does not cause any extensive hydrolysis of the products. The washed extract is then dried with a drying agent, for example, anhydrous $Na_2SO_4$, $CaSO_4$, $CaCl_2$, or crystalline zeolitic molecular sieves, and filtered. The ether of the extract is removed as by evaporating under reduced pressure to yield the products. If necessary, the products are separated as by fractional distillation or used without separation.

Hydrogen chloride acceptors are a convenient means for removing hydrogen chloride from the reaction, although other means, such as pumping off hydrogen chloride under reduced pressure, are within the skill of workers in the art. Examples of hydrogen chloride acceptors are pyridine, quinoline, alkylated pyridines, monoalkyl amines, dialkyl amines, trialkyl amines, piperidine, anhydrous ammonia, hexamethylene tetramine, and other compounds capable of readily combining with hydrogen chloride. Pyridine is a preferred hydrogen chloride acceptor. The preferred pH range of the reaction mixture is from 4 to 8 with pH's of 6.5 to 8 providing the best yields. Siloxane polymer formation is strongly encouraged at pH's outside of the range of 4 to 8 resulting in lowered yields of product. Thus, the preferable amount of hydrogen chloride acceptor employed is that which is capable of preventing the pH of the reaction mixture from exceeding the limits of 4 to 8.

A source of formaldehyde is provided for the reaction by any suitable means. Formaldehyde can be bubbled as a gas into the reaction mixture or it can be provided for reaction by formaldehyde donors such as polyoxymethylene (commonly called para-formaldehyde), dimethylol acetone, aqueous solutions of formaldehyde or aliphatic alcoholic solutions of formaldehyde (such as formaldehyde in methanol, ethanol, propanol, butanol, and the like). It is understood that when aqueous formaldehyde is employed, the amount of water must be less than one mole of water per mole of chlorosilane.

Examples of chlorosilanes which are employed in my process are trimethylchlorosilane, diethylallylchlorosilane, triphenylchlorosilane, tricyclopentylchlorosilane, nonyldimethylchlorosilane, tri(phenylethyl)chlorosilane, and the like.

Preferred temperatures employed in my process are those in the range of −10° C. to +10° C. although temperatures down to −30° C. and up to 60° C. can be employed with, however a lowering of yields. Pressures have not been found to be particularly critical. However, the use of reduced pressures becomes impractical when any of the reactants are highly volatile.

Solvents are not particularly necessary in my process but their use is preferred in order to provide ease of handling of the reactants and products, ease of reaction and high yields of products. The solvents are advantageously employed to dissolve the tri(monovalent hydrocarbon)chlorosilane and hydrogen chloride acceptor (if used) prior to their addition to the formaldehyde and water although they may also be employed to dissolve the formaldehyde and water. The ether solvents such as diethyl ether, methyl butyl ether, diisopropyl ether, dioxane, tetrahydrofuran, ethylene glycol dimethyl ether, and the like, have been found to give the best results.

Hydrocarbon and chlorinated hydrocarbon solvents have also proven to be useful but in some specific instances provide difficulties in handling reaction mixtures in which they are employed. For example, benzene freezes at about 5° C. and toluene tends to form emulsion. The solvents most preferred are water-immiscible ether solvents such as diethyl ether, diisopropyl ether, and methyl butyl ether.

The compounds of this invention can be mixed with organic amines, especially polyamines, and cured to infusible, insoluble resins which are useful as protective coatings particularly for metals. My compounds have been found to be compatible with many organic compounds and, in fact, in many cases dissolve such organic compounds. Thus, the compounds of Formula I when mixed with organic amines form homogeneous mixtures which cure at room temperature to hard, relatively insoluble coatings.

The compounds of this invention are also useful as tanning agents for leather. The leather is prepared for tanning by conventional procedures and the compound (or mixture of compounds) of Formula I is applied to the leather, preferably as a solution of the compound of Formula I in a volatile, polar, organic solvent such as ethers, alcohols or ketones. The concentration of this solution is not critical and can vary over wide limits. The tanning solution can be applied to the leather by painting, spraying and the like, or the leather can be immersed in the solution for a short time. The leather to which the tanning solution has been applied is then dried by conventional methods to yield a uniformly tanned leather.

To illustrate the present invention in more detail, about 220 grams of Methyl Formcel were placed in a flask fitted with a thermometer, stirrer and dropping funnel and the liquid was cooled to $-20°$ C. ("Methyl Formcel" is a commercially available source of formaldehyde composed of 12 weight percent water, 33 weight percent methanol and 55 weight percent dissolved formaldehyde). About 217 grams of $(CH_3)_3SiCl$ and about 160 grams of pyridine were mixed in the dropping funnel and this mixture was added slowly to the well-stirred Methyl Formcel. A temperature between $-10°$ C. and $0°$C. was maintained. Soon pyridine hydrochloride precipitated and a slurry formed.

Next, isopropyl ether and water were added slowly to the stirred mixture. The mixture was then transferred to a large separatory funnel and the layers were separated. The clear ether layer was then washed with water in order to eliminate the remainder of pyridine hydrochloride and excess pyridine and methanol. The isopropyl ether solution was then dried and filtered. The solvent was evaporated under reduced pressure and the solvent-free product was fractionally distilled at atmospheric pressure. Three principal fractions were recovered:

| Fraction | Weight, grams | Boiling Range, °C. |
|---|---|---|
| A | 28 | 91–96 |
| B | 25 | 16–170 |
| C | 30 | 190–235 |

Fraction A was identified by elemental analysis, infrared spectrographic analysis and molecular weight determination as $(CH_3)_3SiOCH_2OH$.

Fraction B was identified by elemental and infrared spectrographic analysis as $(CH_3)_3SiO(CH_2O)_6Si(CH_3)_3$.

Fraction C was identified by elemental and infrared spectrographic analysis as a mixture containing primarily $(CH_3)_3SiO(CH_2O)_7Si(CH_3)_3$.

What is claimed is:

1. Organosilicon compounds represented by the formula:

$$R_3SiO(CH_2O)_nSiR_3$$

wherein R is a monovalent hydrocarbon group containing from one to about ten carbon atoms and $n$ is an integer having a value from 1 to about 10.

2. The compounds in accordance with claim 1 where R is methyl.

3. The compound having the formula $$(CH_3)_3SiO(CH_2O)_6Si(CH_3)_3$$

4. The compound having the formula $$(CH_3)_3SiO(CH_2O)_7Si(CH_3)_3$$

5. A process for producing organosilicon compound represented by the formula:

$$R_3SiO(CH_2O)_nY$$

wherein R is a monovalent hydrocarbon group containing from one to about ten carbon atoms, Y is selected from the class consisting of hydrogen and $R_3Si-$ groups, where R has the meaning defined hereinabove, and $n$ is an integer having a value from 1 to about 10, which process comprises reacting formaldehyde, $R_3SiCl$, where R has the meaning defined hereinabove, and water in an amount of not more than one mole of water per mole of $R_3SiCl$ at a temperature of from $-30°$ C. to $60°$ C. and continuously removing hydrogen chloride from the reaction.

6. A process for producing organosilicon compounds represented by the formula:

$$R_3SiO(CH_2O)_nY$$

wherein R is a monovalent hydrocarbon group containing from one to about ten carbon atoms, Y is selected from the class consisting of hydrogen and $R_3Si-$ groups, where R has the meaning defined hereinabove, and $n$ is an integer having a value from 1 to about 10, which process comprises reacting formaldehyde, $R_3SiCl$, where R has the meaning defined hereinabove, and water in an amount of not more than one mole of water per mole of $R_3SiCl$ at a temperature of from $-10°$ C. to $+10°$ C. and continuously removing hydrogen chloride from the reaction.

7. Process in accordance with claim 6 wherein R is methyl.

8. A process for producing organosilicon compounds represented by the formula:

$$R_3SiO(CH_2O)_nY$$

wherein R is a monovalent hydrocarbon group containing from one to about ten carbon atoms, Y is selected from the class consisting of hydrogen and $R_3Si-$ groups, where R has the meaning defined hereinabove, and $n$ is an interger having a value from 1 to about 10, which process comprises reacting formaldehyde, $R_3SiCl$, where R has the meaning defined hereinabove, and water in an amount of not more than one mole of water per mole of $R_3SiCl$ at a temperature of from $-10°$ C. to $+10°$ C. and continuously removing hydrogen chloride from the reaction by means of a hydrogen chloride acceptor.

9. Process in accordance with claim 8 wherein said hydrogen chloride acceptor is pyridine.

References Cited in the file of this patent

UNITED STATES PATENTS

| | | |
|---|---|---|
| 2,441,066 | Hanford | May 4, 1948 |
| 2,843,560 | Mika | July 15, 1958 |
| 2,906,768 | Haluska | Sept. 29, 1959 |
| 2,916,461 | Krantz | Dec. 8, 1959 |

FOREIGN PATENTS

| | | |
|---|---|---|
| 1,008,732 | Germany | printed May 23, 1957 |

OTHER REFERENCES

Dolgov et al.: Zhurnal Obshchii Khim., 1958, vol. 28, p. 2714–8.